United States Patent
Yamazaki et al.

(10) Patent No.: US 10,634,242 B2
(45) Date of Patent: Apr. 28, 2020

(54) VEHICULAR SHIFTER DEVICE

(71) Applicant: MAZDA MOTOR CORPORATION, Hiroshima (JP)

(72) Inventors: Yoh Yamazaki, Hiroshima (JP); Masayuki Tokumo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 553 days.

(21) Appl. No.: 15/504,164

(22) PCT Filed: Aug. 12, 2015

(86) PCT No.: PCT/JP2015/072822
§ 371 (c)(1),
(2) Date: Feb. 15, 2017

(87) PCT Pub. No.: WO2016/042949
PCT Pub. Date: Mar. 24, 2016

(65) Prior Publication Data
US 2018/0180173 A1    Jun. 28, 2018

(30) Foreign Application Priority Data
Sep. 18, 2014   (JP) .................................. 2014-190120

(51) Int. Cl.
*F16H 59/10*   (2006.01)
*F16H 59/02*   (2006.01)
(Continued)

(52) U.S. Cl.
CPC ........... *F16H 59/105* (2013.01); *B60K 20/08* (2013.01); *F16H 59/0204* (2013.01); *F16H 63/3458* (2013.01); *F16H 2059/0295* (2013.01)

(58) Field of Classification Search
CPC .... F16H 59/105; F16H 59/0217; F16H 59/10; F16H 59/0204; F16H 2059/088;
(Continued)

(56) References Cited

U.S. PATENT DOCUMENTS 6,360,624 B1   3/2002  Sedlmaier et al.
2002/0162699 A1   11/2002  Shiomi et al.
(Continued)

FOREIGN PATENT DOCUMENTS

CN   103946598 A   7/2014
EP   1239192 A2   9/2002
(Continued)

OTHER PUBLICATIONS

An Office Action mailed by the State Intellectual Property Office of the People's Republic of China dated Jun. 11, 2018, which corresponds to Chinese Patent Application No. 201580048725.0 and is related to U.S. Appl. No. 15/504,164.
(Continued)

*Primary Examiner* — Daniel D Yabut
(74) *Attorney, Agent, or Firm* — Studebaker & Brackett PC

(57) ABSTRACT

A vehicular shifter device includes: an operation member; a body portion which supports the operation member to be shiftable from a home position in a predetermined direction, and which causes the operation member after a shift operation to automatically return to the home position; and a control means which controls the range of a transmission on the basis of a shift operation of the operation member. The control means sets the range to a neutral range when the operation member is shifted from the home position in the predetermined direction. The control means switches the range from the neutral range to a travel range when the
(Continued)

operation member is shifted from the home position in the predetermined direction again after the shift operation.

16 Claims, 11 Drawing Sheets

(51) Int. Cl.
*B60K 20/08* (2006.01)
*F16H 63/34* (2006.01)

(58) Field of Classification Search
CPC ..... F16H 2059/0239; F16H 2059/0221; F16H 2059/082; F16H 2059/081; F16H 2059/0295; F16H 2059/0252; F16H 2059/026; B60K 20/08
See application file for complete search history.

(56) References Cited

U.S. PATENT DOCUMENTS

| | | | |
|---|---|---|---|
| 2003/0172762 A1* | 9/2003 | Ehrmaier | F16H 59/0204 |
| | | | 74/473.33 |
| 2004/0025613 A1 | 2/2004 | Meyer et al. | |
| 2004/0216546 A1 | 11/2004 | Shiomi et al. | |
| 2004/0216547 A1 | 11/2004 | Shiomi et al. | |
| 2004/0216549 A1 | 11/2004 | Shiomi et al. | |
| 2008/0108480 A1* | 5/2008 | Kamada | F16H 61/32 |
| | | | 477/115 |
| 2008/0264193 A1 | 10/2008 | Dorn et al. | |
| 2012/0291579 A1 | 11/2012 | Kamoshida | |
| 2014/0013890 A1* | 1/2014 | Kim | F16H 59/105 |
| | | | 74/473.12 |
| 2014/0033849 A1 | 2/2014 | Yamamoto et al. | |
| 2014/0324304 A1 | 10/2014 | Akebono | |
| 2015/0068343 A1* | 3/2015 | Tokumo | F16H 61/0213 |
| | | | 74/473.12 |

FOREIGN PATENT DOCUMENTS

| | | | |
|---|---|---|---|
| JP | 09166210 A * | 6/1997 | ............. F16H 59/02 |
| JP | 4009405 B2 | 11/2007 | |
| JP | 2008-006982 A | 1/2008 | |
| JP | 4373212 B2 | 11/2009 | |
| JP | 2010-105621 A | 5/2010 | |
| JP | 2012-101692 A | 5/2012 | |
| JP | 2014-031826 A | 2/2014 | |
| WO | 2011/090011 A1 | 7/2011 | |

OTHER PUBLICATIONS

International Search Report issued in PCT/JP2015/072822; dated Nov. 17, 2015.

* cited by examiner

VEHICULAR SHIFTER DEVICE

TECHNICAL FIELD

The present invention relates to a vehicular shifter device for switching between transmission ranges of a vehicle, and more particularly, to a momentary-type vehicular shifter device.

BACKGROUND ART

In recent years, a so-called electric shifter device in which the position of a shift lever is electrically detected for operating a transmission is known as a vehicular shifter device for an automobile or the like. It is often the case that an electric shifter device is mounted in an electric vehicle in which a mechanical transmission is not provided, a hybrid vehicle, or the like. However, in view of that an electric shifter device does not require mechanical connection between a shift lever and a transmission, and has a high degree of freedom in design, the electric shifter device is also mounted in a vehicle provided with a mechanical transmission, for instance, in a conventional automobile in which only an engine (an internal combustion engine) is provided as a power source.

An electric shifter device has no constraints on an operation stroke of a shift lever. Therefore, a momentary mechanism is widely used in the aspect of miniaturization and improvement of operability. A momentary-type electric shifter device is configured such that when a shift lever is moved from a home position in which the shift lever stands upright in a predetermined direction, the range of a transmission is changed, and then, when the driver's hand is released from the shift lever, the shift lever automatically returns to the home position while keeping the range unchanged. In a momentary-type electric shifter device having the aforementioned configuration, the range may be unintentionally switched by an erroneous operation that the driver's hand or a passenger's hand or a baggage inadvertently touches the shift lever.

In view of the above, Patent Literature 1 discloses a technique, in which when a shift lever is operated from a home position in a first direction, the range is switched to a neutral range, and when the shift lever is further operated in another direction (a second direction) from the lever position in this state (neutral position), the range is switched to a travel range (a drive range or a reverse range). According to this configuration, even if a passenger inadvertently touches the shift lever, the neutral range is selected, and transmission of a driving force of an engine is cut, without switching the range to the travel range. Therefore, it is possible to minimize an influence by an erroneous operation, even if such an erroneous operation is performed.

Further, Patent Literature 2 discloses a technique, in which when a shift lever is moved from a home position to the position of a first stopper above or below the home position, the range is switched to a neutral range, and when the shift lever is moved from the home position to the position of a second stopper above or below the first stopper, the range is switched to a travel range. According to this configuration, even if a passenger inadvertently touches the shift lever, the shift lever is stopped at the position of the first stopper, and the neutral range is selected without switching the range to the travel range. Therefore, it is possible to minimize an influence by an erroneous operation, even if such an erroneous operation is performed.

Further, Patent Literature 3 discloses a technique, in which a button switch is provided on a shift lever. When the button switch is pressed, the range is switched to a neutral range. When the shift lever is moved in a state that the button switch is continued to be pressed, the range is switched to a travel range. According to this configuration, the range is not switched to the travel range unless the driver presses the button switch and moves the shift lever concurrently. This makes it possible to avoid a situation that the travel range is selected against the driver's intention.

Each of the aforementioned techniques is a technique capable of securing safety against an erroneous operation. However, each of the techniques involves the following problems to be solved.

In the case of Patent Literature 1, in order to select the travel range, the driver has to operate the shift lever in the first direction, and then to operate the shift lever in the second direction. The operation is a two-step operation, and the total stroke of the shift lever is increased. This may make the driver who wishes to select the travel range quickly and easily feel the operation cumbersome. Further, the moving range of the shift lever is increased. This may increase the size of a shifter device.

Patent Literature 2 also involves the same problem as described above. Specifically, in order to select the travel range, the driver has to move the shift lever to the position of the second stopper beyond the first stopper. This may increase the total stroke of the shift lever. This may make the driver who wishes to select the travel range quickly and easily feel the operation cumbersome. Further, the moving range of the shift lever is increased. This may increase the size of a shifter device. In addition to the above, in order to select the neutral range, the driver has to securely stop the shift lever at the position of the first stopper. This also makes it difficult for the driver to operate the shift lever quickly.

In the case of Patent Literature 3, in order to select the travel range, the driver has to move the shift lever while pressing the button switch. This may deprive the driver of easy and comfortable feeling in operating the lever. This may also make the driver who wishes to select the travel range quickly and easily feel the operation cumbersome.

CITATION LIST

Patent Literature

Patent Literature 1: Japanese Patent No. 4,373,212
Patent Literature 2: Japanese Patent No. 4,009,405
Patent Literature 3: Japanese International Publication No. WO 2011/090011

SUMMARY OF INVENTION

In view of the aforementioned circumstances involved in a momentary-type vehicular shifter device, an object of the present invention is to provide a vehicular shifter device which enables to secure safety against an erroneous operation, allows for the driver to select a neutral range or a travel range quickly and easily, and enables to suppress an increase in size of the device.

In order to solve the aforementioned drawbacks, the present invention is directed to a vehicular shifter device including an operation member to be operated by a driver; a body portion which supports the operation member to be shiftable from a home position in a predetermined direction, and which causes the operation member after a shift operation to automatically return to the home position; and a control device which controls a range of a transmission mounted in a vehicle on the basis of a shift operation of the operation member. The control device sets the range to a neutral range when the operation member is shifted from the home position in the predetermined direction, and the control device switches the range from the neutral range to a travel range when the operation member is shifted from the home position in the predetermined direction again after the shift operation.

According to the present invention, in a momentary-type vehicular shifter device, it is possible to secure safety against an erroneous operation, the driver can select a neutral range and a travel range quickly and easily, and it is possible to suppress an increase in size of the device. This contributes to improvement on reliability and product performance of a vehicular shifter device.

DESCRIPTION OF EMBODIMENTS

First Embodiment (1) Configuration

Figure 1:
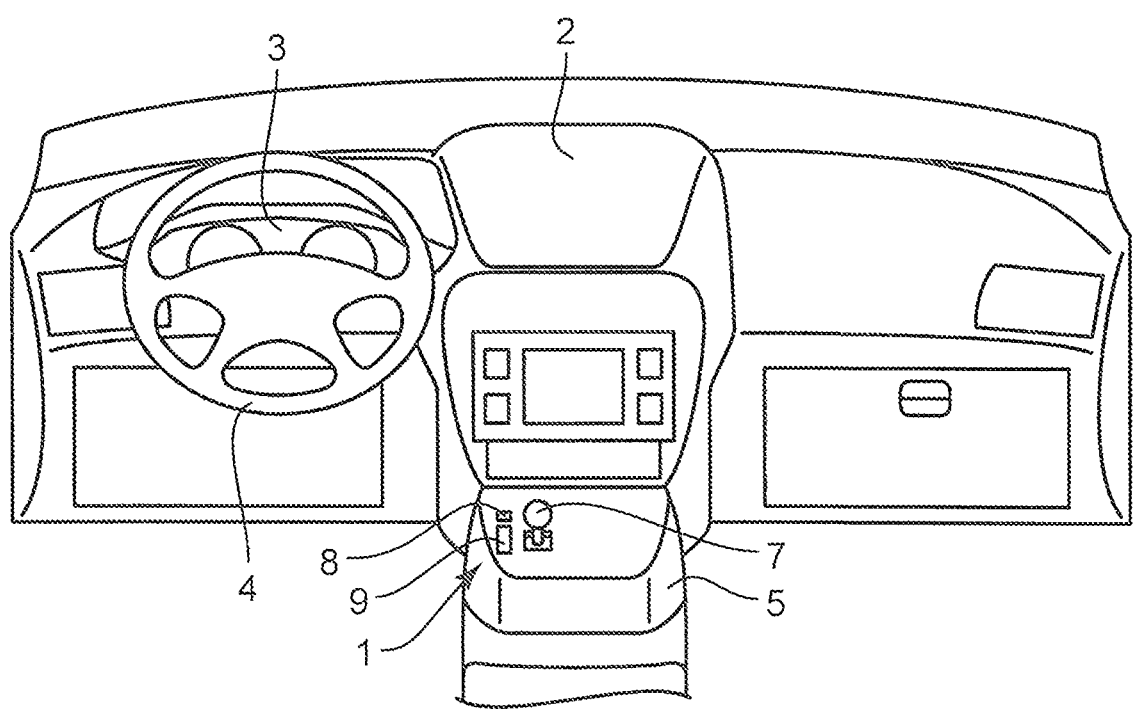
FIG. 1 is a diagram illustrating a configuration of a vehicle compartment front portion of a vehicle to which a shifter device according to a first embodiment of the present invention is applied.

FIG. 1 is a diagram illustrating a configuration of a vehicle compartment front portion of a vehicle according to the embodiment. As illustrated in FIG. 1, an instrument panel 2 extending in the vehicle width direction is provided in the vehicle compartment front portion. A meter unit 3 is provided on the driver's seat side of the instrument panel 2 (on the left side in FIG. 1). A steering wheel 4 is provided behind the meter unit 3. A center console 5 extends from the middle portion of the instrument panel 2 in the vehicle width direction toward the vehicle rear side. A shifter device 1 is provided on the center console 5.

Figure 8:
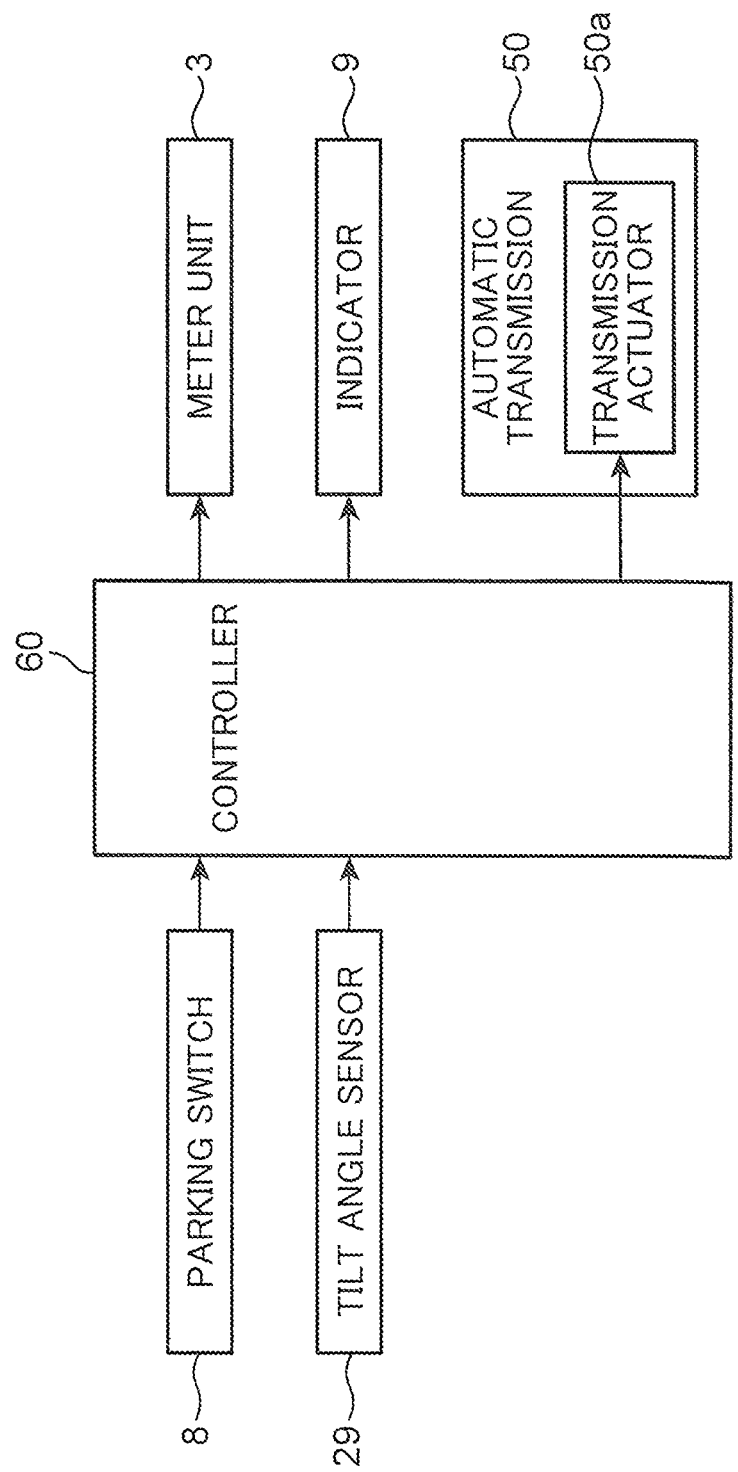
FIG. 8 is a block diagram of a control system of the shifter device.

In the embodiment, a vehicle is provided with an engine (not illustrated) constituted by an internal combustion engine such as a gasoline engine or a diesel engine, and a multi-speed automatic transmission (AT) 50 which transmits a driving force of the engine to wheels while automatically changing the gear ratio according to a vehicle speed or an engine load (see FIG. 8). The ranges (transmission ranges) of the automatic transmission 50 includes a neutral range in which transmission of a driving force is cut, a parking range in which transmission of a driving force is cut, and an output shaft is locked, a drive range (a forward travel range) in which a driving force is transmitted in such a direction as to travel a vehicle in a forward direction, and a reverse range (a reverse travel range) in which a driving force is transmitted in such a direction as to travel a vehicle in a backward direction. In this example, the neutral range and the parking range are non-travel ranges, and the drive range and the reverse range are travel ranges. The shifter device 1 is operated by the driver so that the driver can select an intended range from these ranges.

Figure 2:
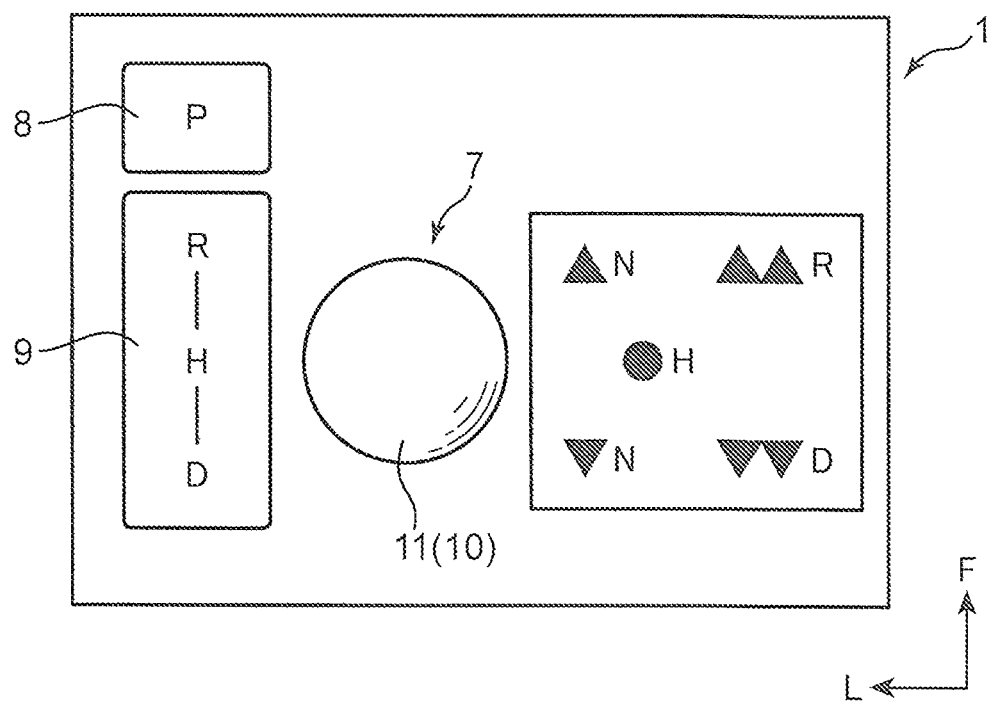
FIG. 2 is a plan view of a portion of a center console of the vehicle where the shifter device is disposed.

FIG. 2 is an enlarged plan view illustrating a portion of the center console 5 where the shifter device 1 is disposed. In FIG. 2 and the drawings thereafter, the symbols F and L respectively denote the vehicle front side and the vehicle left side.

As illustrated in FIG. 2, the shifter device 1 is provided with a parking switch 8 and an indicator 9.

The parking switch 8 is a pressing button switch. The parking switch 8 is operated for switching the range to the parking range. A dial with the character "P" (representing the parking range) is disposed on the upper surface of the parking switch 8. When the parking range is selected, the character "P" is displayed in a highlight manner by a light source such as an LED. The parking switch 8 has a function as a switch for switching the range to the parking range, and a function as an indicator for displaying that the parking range is selected.

The indicator 9 displays a currently selected travel range. The indicator 9 includes a dial, in proximity to the parking switch 8, on which the character "R" (representing the reverse range), the character "H" (representing a home position to be described later), and the character "D" (representing the drive range) are displayed in this order from the front side. When the reverse range or the drive range is selected in response to an operation of a main operation unit 7 to be described next, the character "R" or the character "D", which is associated with the selected range, is displayed in a highlight manner by a light source such as an LED.

In the embodiment, a currently selected range is also displayed on the meter unit 3 (see FIG. 1). The meter unit 3 includes a display portion between a speedometer and a tachometer, for instance. One of the characters "P", "R", "N" (representing the neutral range), and "D", which is associated with a currently selected range, is displayed on the display portion.

As illustrated in FIG. 2, the shifter device 1 is further provided with the main operation unit 7. The main operation unit 7 is operated for switching the range to one of the neutral range, the reverse range, and the drive range, other than the parking range.

Figure 3:
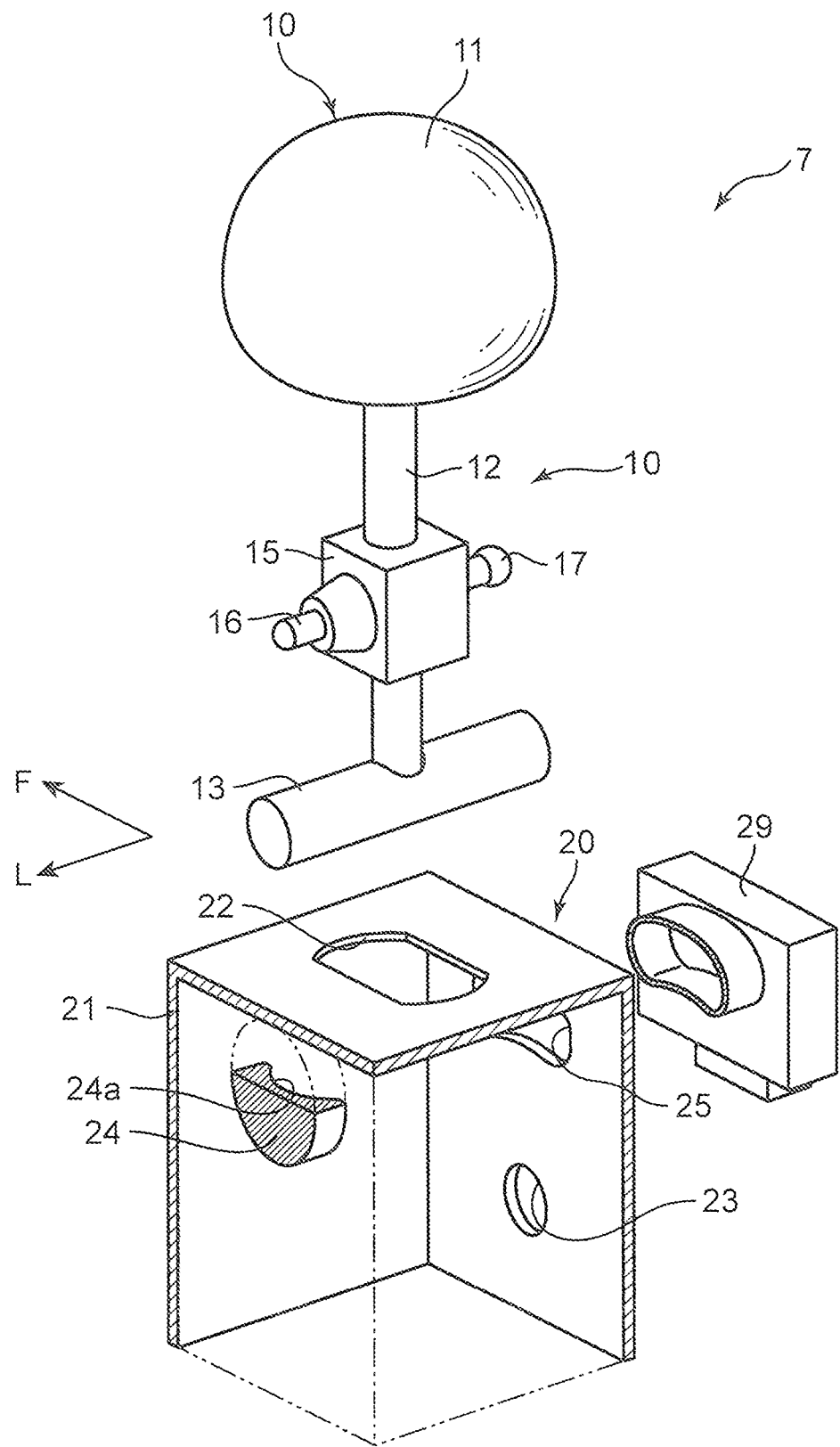
FIG. 3 is a partially cutaway exploded perspective view of the shifter device when viewed from the rear left side.
Figure 4:
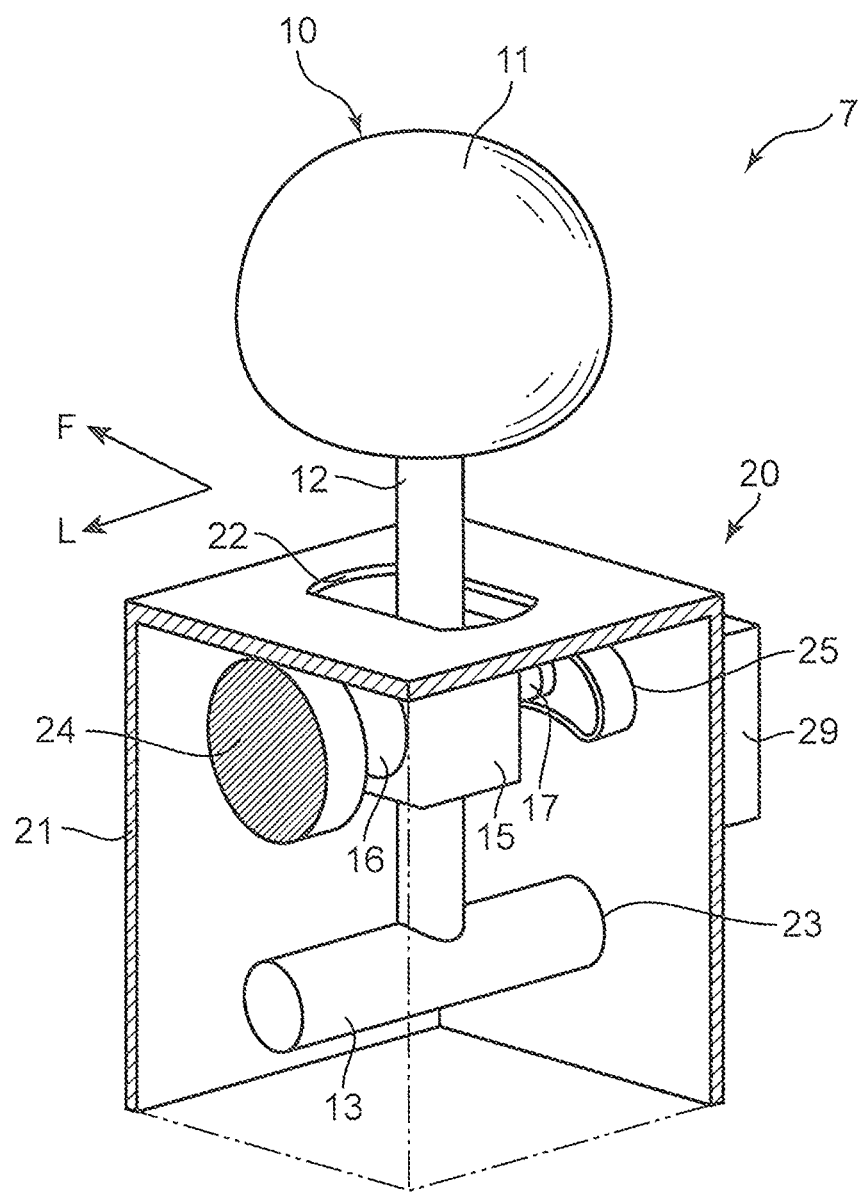
FIG. 4 is a partially cutaway perspective view of the shifter device when viewed from the rear left side.
Figure 5:
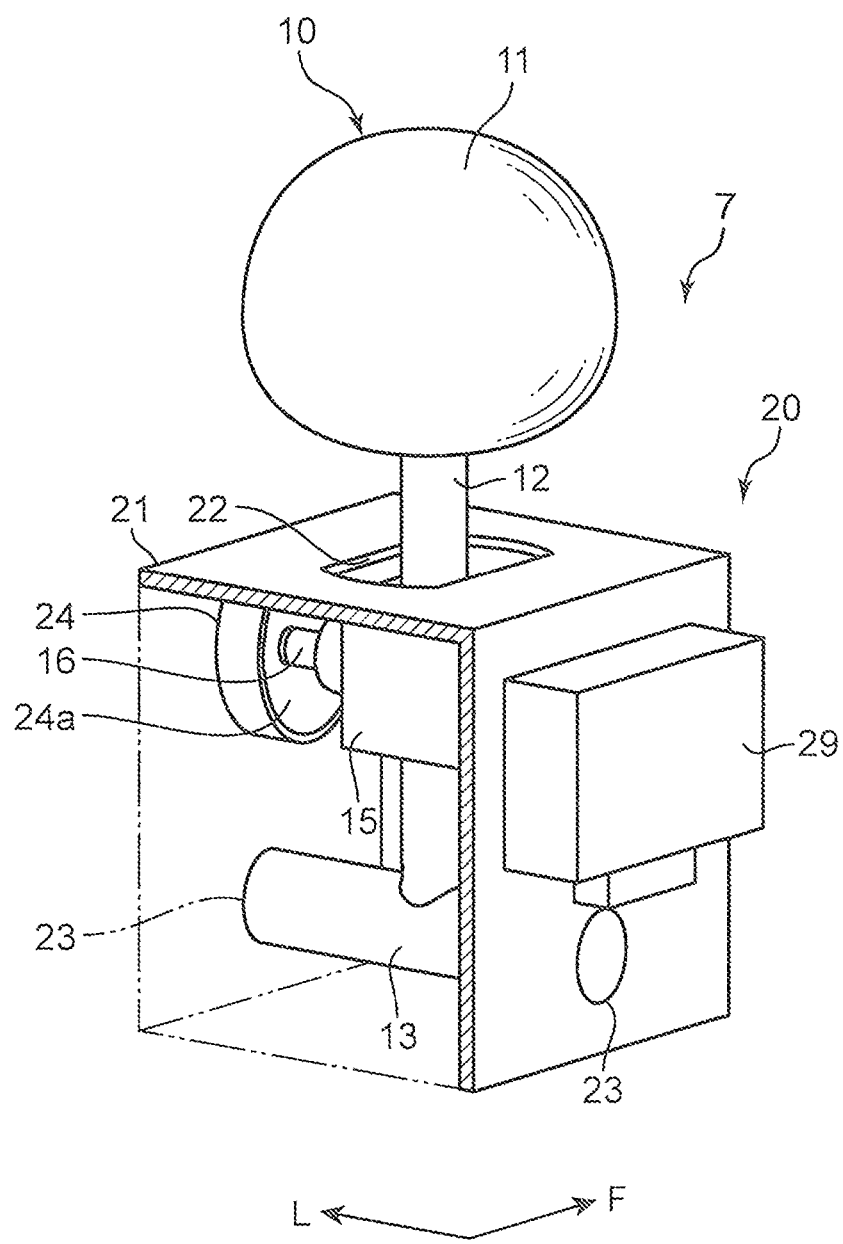
FIG. 5 is a partially cutaway perspective view of the shifter device when viewed from the rear right side.

As illustrated in FIG. 3 to FIG. 5, the main operation unit 7 includes a shift lever 10 (corresponding to an "operation member" in the claims), and a body portion 20 which supports the shift lever 10 to be tiltable in a front-rear direction.

The shift lever 10 includes a lever portion 12 extending in an up-down direction, a shift knob 11 formed at an upper end of the lever portion 12 and to be held by the driver when the shift lever 10 is operated, a columnar-shaped tilt axis portion 13 formed at a lower end of the lever portion 12 and extending in the vehicle width direction, a block body 15 formed at a substantially intermediate position of the lever portion 12 in the up-down direction, a rod-like detent leg portion 16 projecting leftward from a left surface of the block body 15, and a rod-like sensor detected portion 17 projecting rightward from a right surface of the block body 15.

The body portion 20 includes a housing 21 constituted by an upper surface, a front surface, a rear surface, a left surface, and a right surface (in FIG. 3 to FIG. 5, the left surface and the rear surface of the housing 21 are cut away), a detent guide member 24 formed on the inner surface of the left surface of the housing 21, and a tilt angle sensor 29 formed on the right surface of the housing 21 via an arc-shaped opening 25.

An oval-shaped gate 22 extending in the front-rear direction is formed in the upper surface of the housing 21. The lever portion 12 of the shift lever 10 passes through the gate 22. The block body 15 of the lever portion 12 is disposed within the housing 21. A circular opening 23 is formed in the left surface and in the right surface of the housing 21. Left and right ends of the tilt axis portion 13 of the shift lever 10 are pivotally received in the circular openings 23. According to this configuration, the shift lever 10 is supported on the body portion 20 to be tiltable in the front-rear direction via the tilt axis portion 13.

The detent leg portion 16 formed on the left surface of the block body 15, and the detent guide member 24 formed on the left surface of the housing 21 come into contact with each other in a state that the shift lever 10 is supported on the body portion 20. The detent leg portion 16 is projectable and retractable in a left-right direction with respect to the block body 15. The detent leg portion 16 is constantly urged leftward by a compression spring (not illustrated) disposed in the block body 15. As is clear from FIG. 5, a surface of the detent leg portion 16 which comes into contact with the detent guide member 24 is formed into a spherical receiving surface 24a of a partial spherical shape, which is recessed leftward. The tip end of the detent leg portion 16 is constantly pressed against the spherical receiving surface 24a by the leftward urging force of the compression spring.

Figure 6:
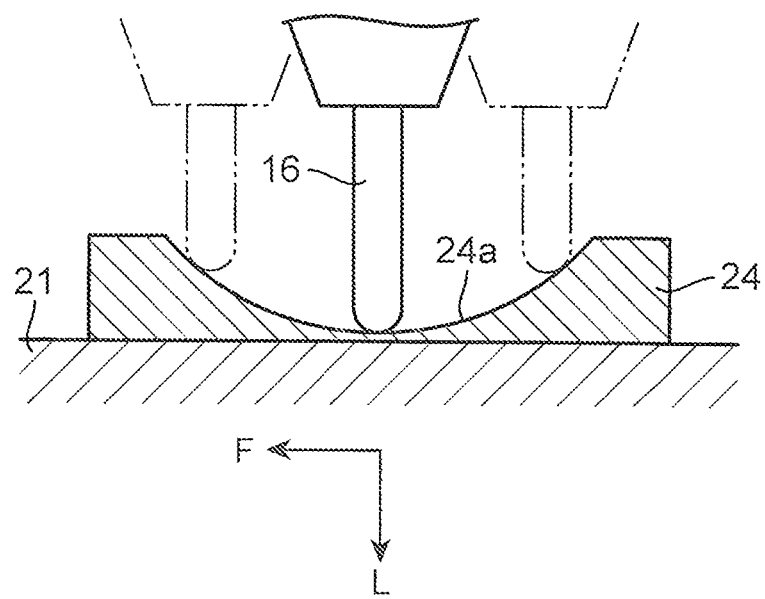
FIG. 6 is a planar sectional view for describing a detent mechanism incorporated in the shifter device.

As indicated by the solid line in FIG. 6, when the detent leg portion 16 comes into contact with a center portion of the spherical receiving surface 24a (a bottom portion of the recessed spherical surface), the detent leg portion 16 is projected maximally from the block body 15. In this case, the compression spring is maximally expanded, and the urging force thereof is lowered. On the other hand, as indicated by the chain line in FIG. 6, as the detent leg portion 16 is moved away from the center portion of the spherical receiving surface 24a, the detent leg portion 16 is retracted inside the block body 15. In this case, the compression spring is contracted, and the urging force thereof is increased. As a result, the retracted detent leg portion 16 is pressed strongly against the spherical receiving surface 24a. The pressing force of the detent leg portion 16 is transformed into a force of returning the detent leg portion 16 to the center portion of the spherical receiving surface 24a. According to this configuration, when an operating force in the front-rear direction is not exerted on the shift lever 10, the shift lever 10 is kept at a position where the detent leg portion 16 is located at the center portion of the spherical receiving surface 24a. The position of the shift lever 10 in this case is referred to as a "home position". When the shift lever 10 is in the home position, the shift lever 10 stands upright in a vertical direction (see FIG. 4 and FIG. 5).

When the shift lever 10 in the home position is tilted in the front-rear direction by receiving an operating force, the detent leg portion 16 is moved away from the center portion of the spherical receiving surface 24a. Accompanied by the tilting operation of the shift lever 10, a force of returning the detent leg portion 16 to the center portion of the spherical receiving surface 24a is generated. As a result, when the operating force with respect to the shift lever 10 is released, the shift lever 10 returns to the home position. Specifically, the shifter device of the embodiment is a momentary-type shifter device including the body portion 20 which supports the shift lever 10 to be tiltable from the home position in the front-rear direction, and which causes the shift lever 10 after a tilting operation to automatically return to the home position.

Referring back to FIG. 3 to FIG. 5, the sensor detected portion 17 formed on the right surface of the block body 15, and the tilt angle sensor 29 formed on the right surface of the housing 21 are engaged with each other in a state that the shift lever 10 is supported on the body portion 20. The tilt angle sensor 29 detects a tilt angle of the shift lever 10 when the shift lever 10 is tilted in the front-rear direction from the home position by detecting a position of the sensor detected portion 17.

Figure 7:
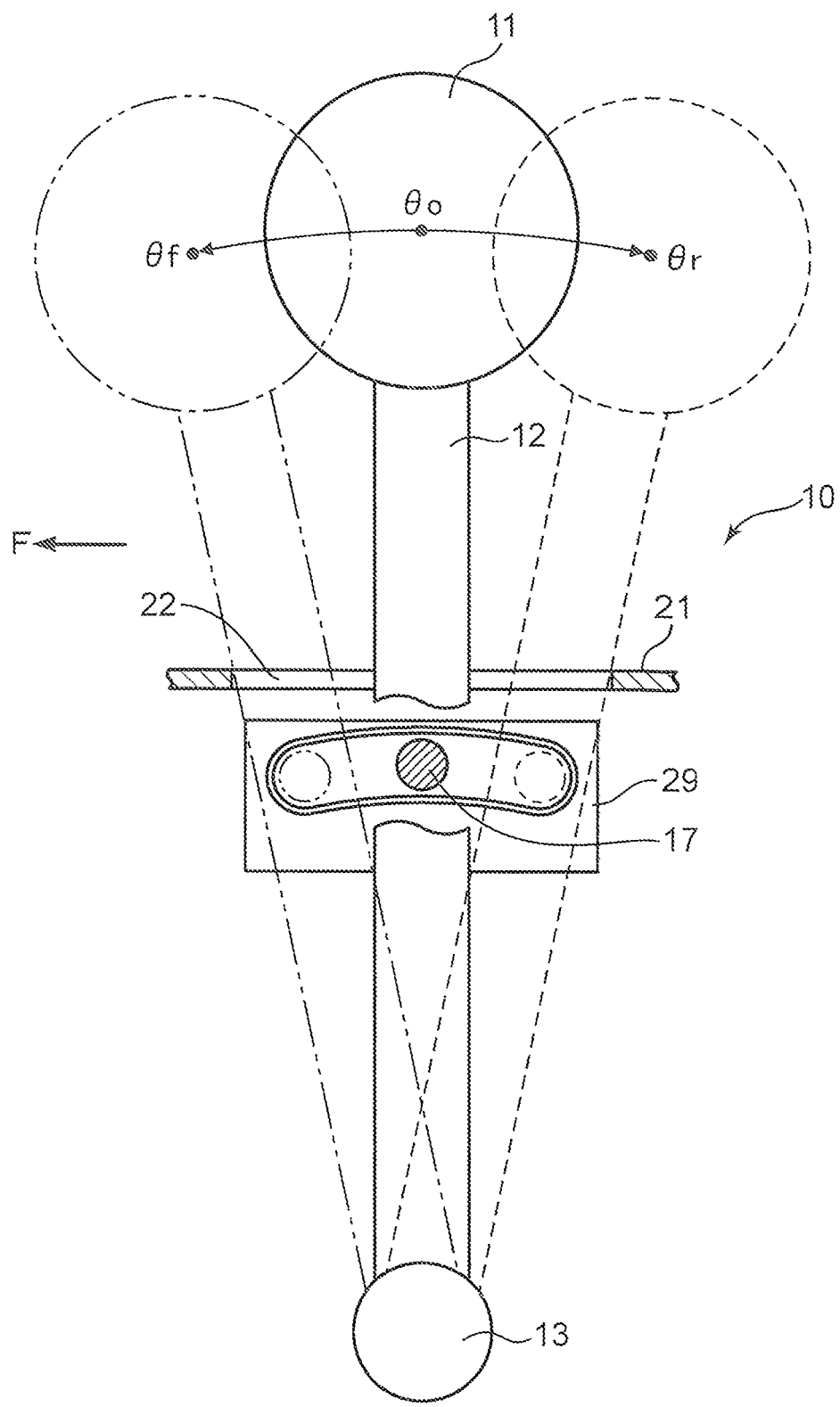
FIG. 7 is a left longitudinal sectional view for describing a tilting operation of a shift lever incorporated in the shifter device.

FIG. 7 is a left longitudinal sectional view for describing a tilting operation of the shift lever 10. In FIG. 7, the solid line indicates a reference state in which the shift lever 10 is kept at the home position. When the shift lever 10 is in the reference state, the shift lever 10 has an upright posture at a middle portion of the gate 22 extending in the front-rear direction.

As indicated by the broken line in FIG. 7, when the shift lever 10 is tilted rearward (corresponding to a "first direction" in the claims) from the home position, and the lever portion 12 comes into contact with a rear end of the gate 22, the shift lever 10 is not tiltable rearward beyond the contact position. The position of the shift lever 10 in this state is referred to as a "rear limit position". Likewise, as indicated by the chain line in FIG. 7, when the shift lever 10 is tilted forward (corresponding to a "second direction" in the claims) from the home position, and the lever portion 12 comes into contact with a front end of the gate 22, the shift lever 10 is not tiltable forward beyond the contact position. The position of the shift lever 10 in this state is referred to as a "front limit position". Specifically, the shift lever 10 is tiltable between the home position (indicated by the solid line), the rear limit position (indicated by the broken line) away from the home position rearward, and the front limit position (indicated by the chain line) away from the home position forward.

When the title angle $\theta o$ (referred to as a reference tilt angle) of the shift lever 10 when the shift lever 10 is in the home position is determined in advance, the tilt angle $\theta r$ (referred to as a rear limit angle) of the shift lever 10 when the shift lever 10 is in the rear limit position, and the tilt angle $\theta f$ (referred to as a front limit angle) of the shift lever 10 when the shift lever 10 is in the front limit position are also determined in advance. Therefore, when the rear limit angle $\theta r$ is detected by the tilt angle sensor 29, it is detected that the shift lever 10 is in the rear limit position. When the front limit angle $\theta f$ is detected by the tilt angle sensor 29, it is detected that the shift lever 10 is in the front limit position. Likewise, when the reference tilt angle $\theta o$ is detected by the tilt angle sensor 29, it is detected that the shift lever 10 is in the home position.

FIG. 8 is a block diagram illustrating a control system of the shifter device 1. In FIG. 8, a controller 60 is constituted by a well-known microcomputer including a CPU, an RAM, and an ROM. The controller 60 corresponds to a "control device" in the claims. In FIG. 8, the controller 60 is indicated by a block. Alternatively, the controller 60 may be constituted by a plurality of microcomputers such that one of the microcomputers is provided on a vehicle body side and the other of the microcomputers is provided on the automatic transmission 50 side.

The controller 60 is electrically connected to the meter unit 3, the parking switch 8, the indicator 9, the tilt angle sensor 29, and a transmission actuator 50a of the automatic transmission 50. Note that an example of the transmission actuator 50a of the automatic transmission 50 is a solenoid valve which switches between engagement and release of frictional engagement elements such as clutches and brakes provided in the automatic transmission 50. Specifically, the controller 60 also has a function of controlling a gear changing operation of the automatic transmission 50 on the basis of an operation state of the shifter device 1.

The controller 60 determines whether or not the parking switch 8 is pressed according to a signal to be output from a contact provided in the parking switch 8. The controller 60 determines whether the shift lever 10 is held in the home position, or a tilt amount of the shift lever 10 in a forward direction or in a rearward direction according to a signal to be output from the tilt angle sensor 29. Further, the controller 60 executes range switching control of the automatic transmission 50, and display control of the meter unit 3 and the indicator 9 (control of displaying a currently selected range) on the basis of the operation state of the shifter device 1 determined in the above manner.

In the embodiment, shift patterns of the shifter device 1 are set as follows under the control of the controller 60 described as above.

Specifically, when the shift lever 10 is tilted from the home position to the rear limit position one time, no matter in which range the automatic transmission 50 is currently set, the range is set to the neutral range. Then, when the shift lever 10 is tilted within a predetermined period of time (e.g. two seconds) from the time when the shift lever 10 is tilted for the first time, in other words, when the shift lever 10 is tilted from the home position to the rear limit position again, the range is switched from the neutral range to the drive range.

Likewise, when the shift lever 10 is tilted from the home position to the front limit position one time, no matter in which range the automatic transmission 50 is currently set, the range is set to the neutral range. Then, when the shift lever 10 is tilted within a predetermined period of time (e.g. two seconds) from the time when the shift lever 10 is tilted for the first time, in other words, when the shift lever 10 is tilted from the home position to the front limit position again, the range is switched from the neutral range to the reverse range.

In any case other than the above, for instance, when a second time tilting operation is not performed, when a second time tilting operation is performed after lapse of the predetermined period of time, when the direction of a second time tilting operation is different from the direction of a first time tilting operation, or when a second time tilting operation does not reach the rear limit position or the front limit position, the range is kept at the neutral range.

As illustrated in FIG. 2, the shift patterns are indicated on the side of the shift lever 10 of the main operation unit 7 in terms of symbols for the convenience of the driver. Specifically, the symbol "▼N" indicating that the neutral range is set when the shift lever 10 is tilted rearward from the home position (indicated by ⬢H) one time, the symbol "▼▼D" indicating that the drive range is set when the shift lever 10 is tilted rearward from the home position consecutively two times, the symbol "▲N" indicating that the neutral range is set when the shift lever 10 is tilted forward from the home position one time, and the symbol "▲▲R" indicating that the reverse range is set when the shift lever 10 is tilted forward from the home position consecutively two times are displayed.

On the other hand, in order to switch the range from the range other than the parking range to the parking range, the driver presses the parking switch 8, without using the shift lever 10. Specifically, when the parking switch 8 is pressed in a state that the current range is one of the neutral range, the reverse range, and the drive range, the range is switched to the parking range.

Further, in order to switch the range from the parking range to the range other than the parking range, the driver is only required to tilt the shift lever 10 forward or rearward from the home position. The driver does not have to release the parking switch 8. Specifically, when the shift lever 10 is tilted to the rear limit position or to the front limit position one time in a state that the current range is the parking range, the range is switched to the neutral range. When the shift lever 10 is tilted two times, the range is switched to the drive range or to the reverse range.

Figure 9:
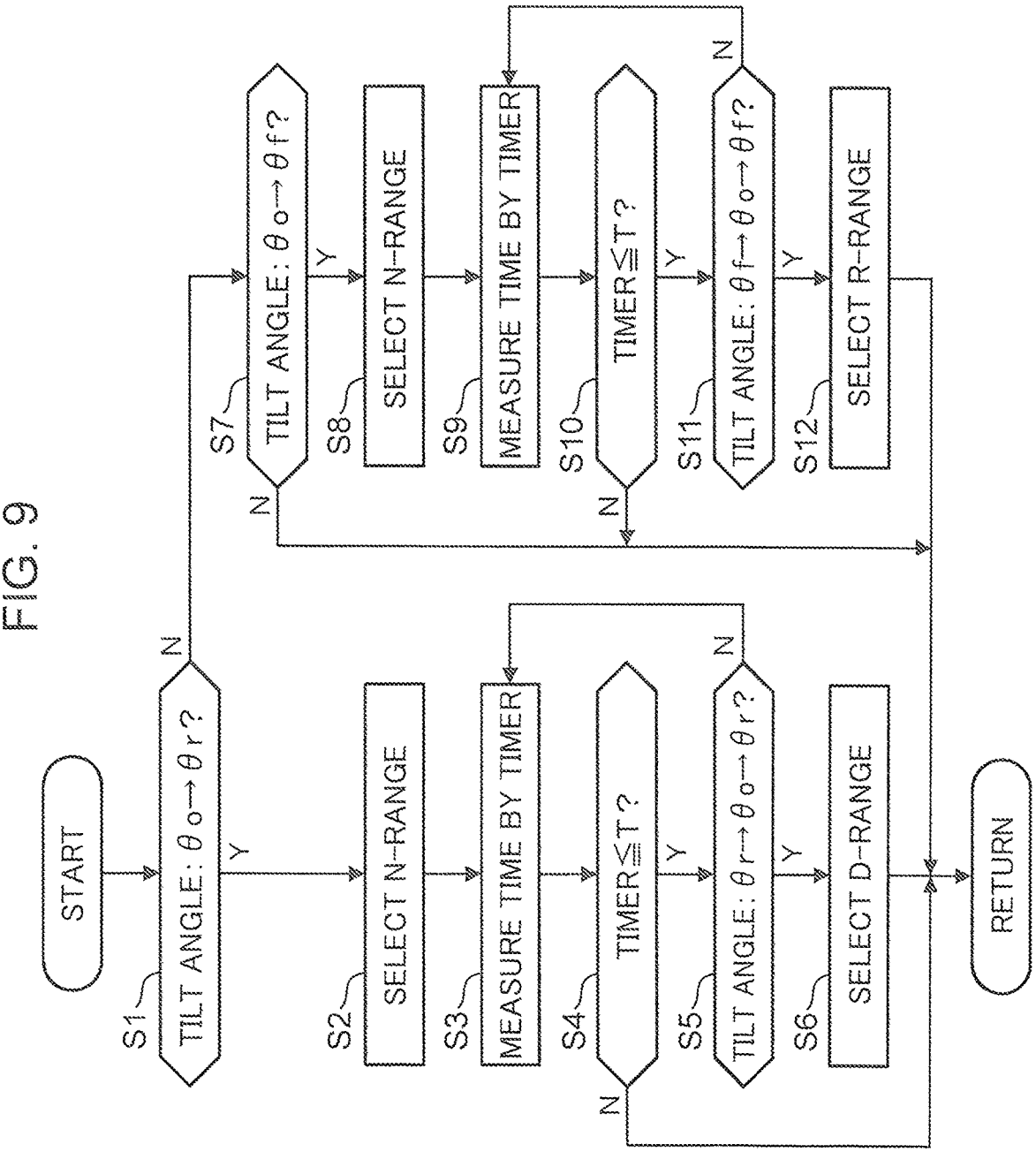
FIG. 9 is a flowchart of a range selecting operation to be performed by a controller of the shifter device.

In summary, a range selecting operation to be performed by the controller 60 is described in accordance with the flowchart of FIG. 9. The range selecting operation is started from a reference state in which the shift lever 10 is kept at the home position.

In Step S1, the controller 60 determines whether or not the tilt angle detected by the tilt angle sensor 29 has changed from the reference tilt angle θo to the rear limit angle θr. In other words, the controller 60 determines whether or not the shift lever 10 is tilted from the home position to the rear limit position. When the determination result in Step S1 is YES, the flow proceeds to Step S2, and when the determination result in Step S1 is NO, the flow proceeds to Step S7.

In Step S2, the controller 60 selects the neutral range. Subsequently, in Step S3, the controller 60 causes a timer to measure a time. Subsequently, in Step S4, the controller 60 determines whether the value of the timer is not larger than a predetermined threshold value T. In other words, the controller 60 determines whether or not the time is within a predetermined period of time after a first time tilting operation is performed. When the determination result in Step S4 is YES, the flow proceeds to Step S5. When the determination result in Step S4 is NO, the flow returns (the range is determined to be the neutral range).

In Step S5, the controller 60 determines whether or not the tilt angle detected by the tilt angle sensor 29 has changed from the rear limit angle θr to the reference tilt angle θo, and further has changed from the reference tilt angle θo to the rear limit angle θr. In other words, the controller 60 determines whether or not the shift lever 10 returns from the rear limit position to the home position, and then is tilted from the home position to the rear limit position. When the determination result in Step S5 is YES, the flow proceeds to Step S6. When the determination result in Step S5 is NO, the flow returns to Step S3.

In Step S6, the controller 60 selects the drive range, and the flow returns (the range is determined to be the drive range).

On the other hand, when the flow proceeds from Step S1 to Step S7, in Step S7, the controller 60 determines whether or not the tilt angle detected by the tilt angle sensor 29 has changed from the reference tilt angle θo to the front limit angle θf. In other words, the controller 60 determines whether or not the shift lever 10 is tilted from the home position to the front limit position. When the determination result in Step S7 is YES, the flow proceeds to Step S8. When the determination result in Step S7 is NO, the flow returns.

In Step S8, the controller 60 selects the neutral range. Subsequently, in Step S9, the controller 60 causes the timer to measure a time. Subsequently, in Step S10, the controller 60 determines whether the value of the timer is not larger than the predetermined threshold value T. In other words, the controller 60 determines whether or not the time is within a predetermined period of time after a first time tilting operation is performed. When the determination result in Step S10 is YES, the flow proceeds to Step S11. When the determination result in Step S10 is NO, the flow returns (the range is determined to be the neutral range).

In Step S11, the controller 60 determines whether or not the tilt angle detected by the tilt angle sensor 29 has changed from the front limit angle $\theta f$ to the reference tilt angle $\theta o$, and further has changed from the reference tilt angle $\theta o$ to the front limit angle $\theta f$. In other words, the controller 60 determines whether or not the shift lever 10 returns from the front limit position to the home position, and then, is tilted from the home position to the front limit position. When the determination result in Step S11 is YES, the flow proceeds to Step S12. When the determination result in Step S11 is NO, the flow returns to Step S9.

In Step S12, the controller 60 selects the reverse range, and the flow returns (the range is determined to be the reverse range).

(2) Advantageous Effects

The embodiment is described in detail as above referring to the drawings. The vehicular shifter device 1 of the embodiment includes the shift lever 10 to be operated by the driver, the body portion 20 which supports the shift lever 10 to be tiltable from the home position in the front-rear direction, and which causes the shift lever 10 after a tilting operation to automatically return to the home position, and the controller 60 which controls the range of the automatic transmission 50 mounted in a vehicle on the basis of a tilting operation of the shift lever 1. The controller 60 sets the range to the neutral range when the shift lever 10 is tilted rearward or forward from the home position, and switches the range from the neutral range to the drive range, which is a forward travel range, or to the reverse range, which is a reverse travel range, when the shift lever 10 is tilted rearward or forward from the home position after the aforementioned tilting operation.

According to the aforementioned configuration, when the neutral range is selected, the driver is only required to tilt the shift lever 10 from the home position in the front-rear direction, without the need of pressing a button switch, for instance. Further, when a travel range i.e. the drive range or the reverse range is selected, the driver is only required to repeat the same tilting operation as when the neutral range is selected, without the need of pressing a button switch, for instance. Therefore, the driver can select the neutral range, the drive range, and the reverse range quickly and easily by a tilting operation of the shift lever 10. In addition to the above, it is possible to confirm a driver's intention of selecting the travel range by repeat of the same operation.

Further, the shift lever 10 is tilted from the home position only in the front-rear direction. This makes it possible to make the tilt range of the shift lever 10 small. This is advantageous in miniaturizing the shifter device 1. Furthermore, even if a passenger inadvertently touches the shift lever 10, the neutral range is selected, and transmission of a driving force of an engine is cut. This is advantageous in securing safety against an erroneous operation.

As described above, in the embodiment, provided is the vehicular shifter device 1 which enables to secure safety against an erroneous operation, allows for the driver to select the neutral range and the travel range quickly and easily, and enables to suppress an increase in size of the device.

Further, causing the driver to tilt the shift lever 10 from the home position in a forward direction or in a rearward direction, which is different from each other, allows for the driver to clearly select the drive range or the reverse range, whose traveling direction is different from each other, while distinguishing the drive range and the reverse range from each other.

In the embodiment, when the shift lever 10 is operated in the same manner as a first time tilting operation within the predetermined period of time T after the first time tilting operation (YES in Step S5 or Step S11), the controller 60 switches the range to the drive range or to the reverse range (Step S6 or Step S12). When the shift lever 10 is not operated in the same manner as a first time tilting operation within the predetermined period of time T after the first time tilting operation (NO in Step S4 or Step S10), the controller 60 keeps the range at the neutral range.

According to the aforementioned configuration, the range is switched to the travel range only when a same tilting operation is consecutively performed within the predetermined period of time T. This makes it possible to clearly confirm a driver's intention of selecting the travel range. On the other hand, unless otherwise, for instance, when the driver wishes to keep the range to the neutral range, and a second time tilting operation is not performed, or when a second time tilting operation is performed after lapse of the predetermined period of time T, the range is kept at the neutral range. This is advantageous in securing safety.

In the embodiment, when the shift lever 10 is tilted in a different manner from a first time tilting operation after the first time tilting operation (NO in Step S5 or Step S11), the controller 60 keeps the range at the neutral range.

According to the aforementioned configuration, when a driver's intention of selecting the travel range cannot be confirmed because the direction of a second time tilting operation is different from the direction of a first time tilting operation, or because a second time tilting operation does not reach the rear limit position or the front limit position (a tilt amount of the shift lever 10 is insufficient), or the like, the range is kept at the neutral range. This is advantageous in securing safety.

In the embodiment, the shifter device 1 includes the parking switch 8 to be operated by the driver. When the parking switch 8 is pressed, the controller 60 sets the range to the parking range. When the shift lever 10 is tilted rearward or forward from the home position in a state that the range is set to the parking range, the controller 60 switches the range from the parking range to the neutral range or further to the travel range.

According to the aforementioned configuration, a tilting operation of the shift lever 10 also functions as a release operation of the parking switch 8. Therefore, in order to switch the range from the parking range to the neutral range, the driver does not have to release the parking switch 8. This is advantageous in improving operability in selecting the range: P→N, P→N→D, or P→N→R.

Furthermore, according to the aforementioned configuration, the driver can select the neural range or the travel range quickly and easily by tilting the shift lever 10.

Second Embodiment

Figure 10:
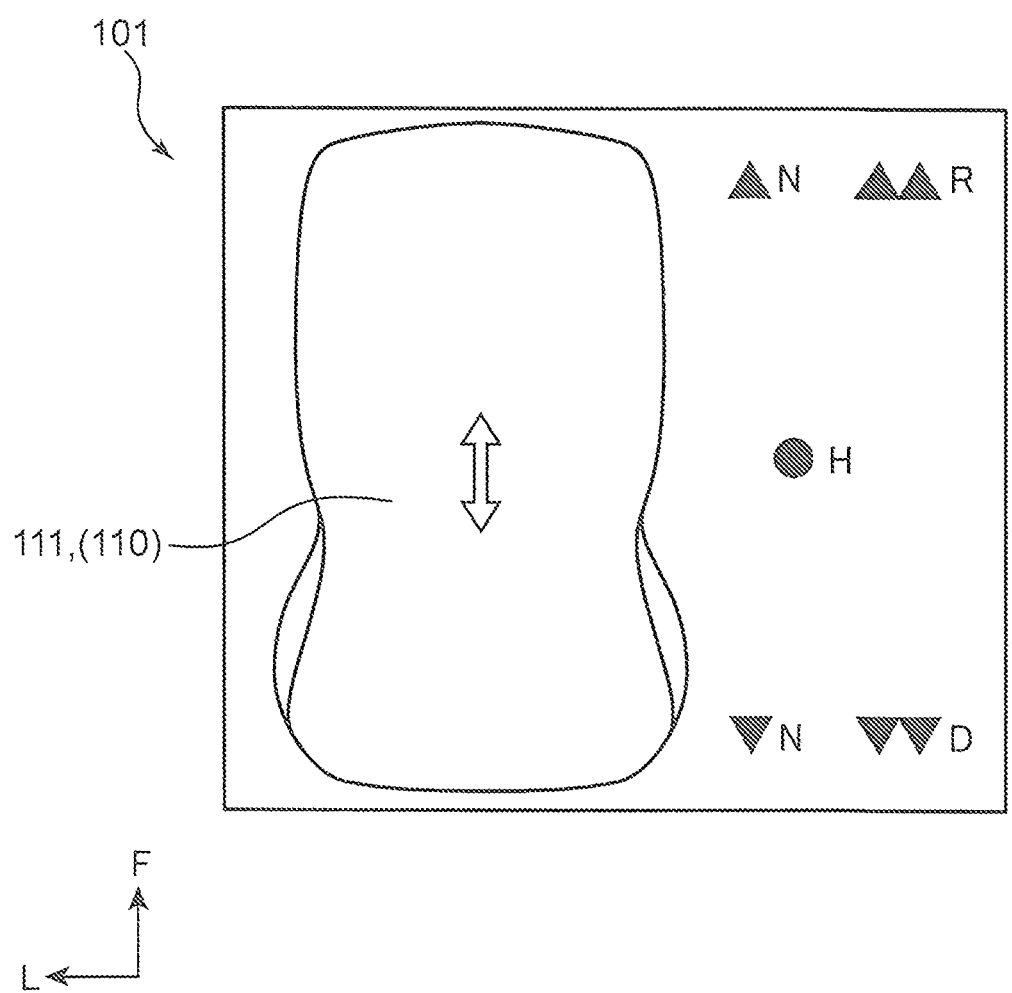
FIG. 10 is a diagram corresponding to FIG. 2, illustrating a second embodiment of the present invention.

In the first embodiment, the operation member is the shift lever 10 supported on the body portion 20 to be tiltable. The operation member is not limited to the above. For instance, the operation member may be a slide member supported on a body portion to be slidable. An example of the slide member is illustrated in FIG. 10. Description on the same elements in the second embodiment as those in the first embodiment is omitted, and only the features of the second embodiment are described.

In FIG. 10, a shifter device 101 includes a slide member 110 supported on a body portion (not illustrated) to be slidable in the front-rear direction. The slide member 110 includes a holding portion 111 to be held by the driver in operating the slide member 110. The holding portion 111 has a shape similar to a mouse for use with a personal computer. The shifter device 101 is a momentary-type shifter device which causes the slide member 110 after a sliding operation to automatically return to the home position illustrated in FIG. 10. As illustrated in FIG. 10, on the side of the slide member 110, there are displayed the symbol "▼N" indicating that the neutral range is set when the slide member 110 is slid rearward from the home position (H) one time; the symbol "▼▼D" indicating that the drive range is set when the slide member 110 is slid rearward from the home position consecutively two times; the symbol "▲N" indicating that the neutral range is set when the slide member 110 is slid forward from the home position one time; and the symbol "▲▲R" indicating that the reverse range is set when the slide member 110 is slid forward from the home position consecutively two times for the convenience of the driver.

Note that the aforementioned detent leg portion and the aforementioned detent guide member may be provided as a mechanism for returning the slide member 110 to the home position. Alternatively, a front return spring which urges the slide member 110 rearward, and a rear return spring which urges the slide member 110 forward may be disposed at a front position and at a rear position with respect to the slide member 110.

Third Embodiment

Figure 11:
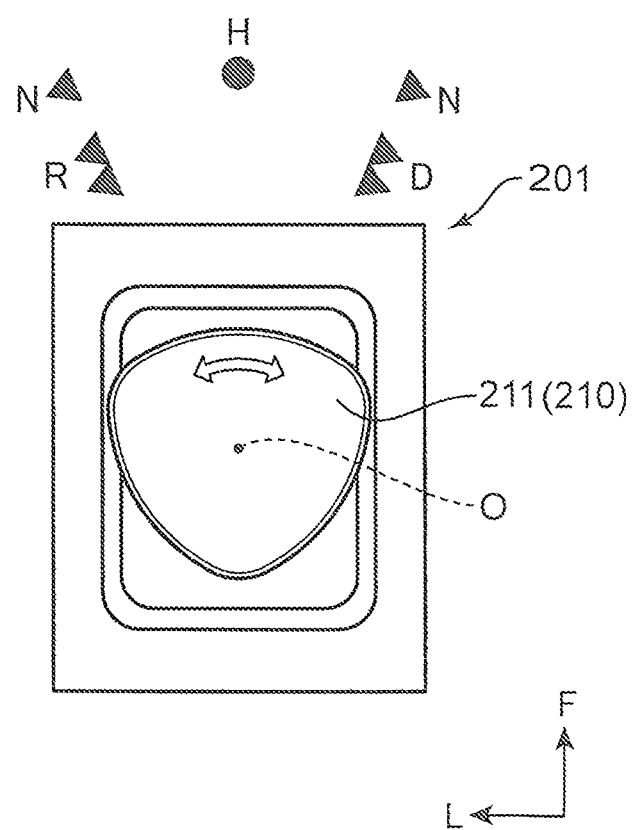
FIG. 11 is a diagram corresponding to FIG. 2, illustrating a third embodiment of the present invention.

Further, the operation member may be a dial member supported on a body portion to be pivotable. An example of the dial member is illustrated in FIG. 11. Description on the same elements in the third embodiment as those in the first embodiment is omitted, and only the features of the third embodiment are described.

In FIG. 11, a shifter device 201 includes a dial member 210 supported on a body portion (not illustrated) to be pivotable in the left-right direction (counterclockwise or clockwise). The dial member 210 includes a holding portion 211 to be held by the driver in operating the dial member 210. The holding portion 211 is disposed in such a manner that a pivot shaft O extends in the up-down direction. The shifter device 201 is a momentary-type shifter device which causes the dial member 210 after a pivot operation to automatically return to the home position illustrated in FIG. 11. As illustrated in FIG. 11, on the front side of the dial member 210, there are displayed the symbol (combination of an obliquely rightward black triangle and the character N) indicating that the neutral range is set when the dial member 210 is pivotally moved rightward from the home position one time; the symbol (combination of two obliquely rightward black triangles and the character D) indicating that the drive range is set when the dial member 210 is pivotally moved rightward from the home position consecutively two times; the symbol (combination of an obliquely leftward black triangle and the character N) indicating that the neutral range is set when the dial member 210 is pivotally moved leftward from the home position one time; and the symbol (combination of obliquely leftward two black triangles and the character R) indicating that the reverse range is set when the dial member 210 is pivotally moved leftward from the home position consecutively two times for the convenience of the driver.

Note that a torsion spring which urges the dial member 210 rightward, and a torsion spring which urges the dial member 210 leftward may be wound around the pivot shaft O as a mechanism for returning the dial member 210 to the home position.

<Modifications>

In the first and second embodiments, the shifter device is configured such that the direction of selecting the drive range is a rearward direction, and the direction of selecting the reverse range is a forward direction. Conversely, the direction of selecting the drive range may be a forward direction, and the direction of selecting the reverse range may be a rearward direction. Further, the shift direction of the operation member (10, 110) is a front-rear direction. Alternatively, the shift direction may be, for instance, a left-right direction.

In the third embodiment, the shifter device 201 is configured such that the direction of selecting the drive range is the rightward direction, and the direction of selecting the reverse range is the leftward direction. Conversely, the direction of selecting the drive range may be the leftward direction, and the direction of selecting the reverse range may be the rightward direction. Further, the shift direction of the dial member 210 is the left-right direction. Alternatively, the shift direction of the dial member 210 may be, for instance, the up-down direction (for instance, the pivot shaft O is disposed to extend in the vehicle width direction).

In each of the embodiments, the shifter device is configured to switch the range of the multi-speed automatic transmission (AT) 50. Alternatively, the shifter device may be configured to switch the range of a continuously variable transmission (CVT).

In each of the embodiments, the shifter device is applied to a so-called left-hand drive vehicle (see FIG. 1). The shifter device may also be applied to a right-hand drive vehicle. In this case, for instance, the layout of the parking switch 8 and the indicator 9, and the shift lever 10 illustrated in FIG. 2, and display of symbols of the shift patterns illustrated in FIG. 2, FIG. 10, and FIG. 11 may be preferably inverted horizontally.

In the embodiments, when the operation member (10, 110, 210) is operated one time, the neutral range is set, and when the operation member is operated two times, the travel range is set. However, the number of times of operations is not limited to the above.

In the first embodiment, when the reference tilt angle $\theta o$ is detected by the tilt angle sensor 29, it is determined that the shift lever 10 is in the home position; when the rear limit angle $\theta r$ is detected by the tilt angle sensor 29, it is determined that the shift lever 10 is in the rear limit position; and when the front limit angle $\theta f$ is detected by the tilt angle sensor 29, it is determined that the shift lever 10 is in the front limit position. Alternatively, an error allowable range may be set for each of the reference tilt angle $\theta o$, the rear limit angle $\theta r$, and the front limit angle $\theta f$.

In the embodiments, the present invention is applied to a vehicle provided with an engine constituted by an internal combustion engine. It is needless to say that the present invention is not limited to the above. For instance, the present invention is applicable to an electric vehicle or a hybrid vehicle, which is provided with a drive motor as a power source, and is capable of traveling by the drive motor.

Summary of Embodiments

Lastly, the features and the advantageous effects disclosed in the embodiments will be briefly described.

A vehicular shifter device includes an operation member to be operated by a driver; a body portion which supports the operation member to be shiftable from a home position in a predetermined direction, and which causes the operation member after a shift operation to automatically return to the home position; and a control means which controls a range of a transmission mounted in a vehicle on the basis of a shift operation of the operation member. The control means sets the range to a neutral range when the operation member is shifted from the home position in the predetermined direction, and the control means switches the range from the neutral range to a travel range when the operation member is shifted from the home position in the predetermined direction again after the shift operation.

In the shifter device having the aforementioned configuration, when the driver selects the neutral range, the driver is only required to shift the operation member from the home position in the predetermined direction without the need of pressing a button switch, for instance. Further, when the driver selects the travel range, the driver is only required to repeat a shift operation in the same manner as when the driver selects the neutral range, without the need of pressing a button switch. This allows for the driver to select a range quickly and easily. In addition to the above, it is possible to confirm a driver's intention of selecting the travel range by repeat of the same operation.

Further, the operation member is shifted from the home position only in the predetermined direction. This makes it possible to make the shift range of the operation member small. This is advantageous in miniaturizing the device. Further, even if a passenger inadvertently touches the operation member, the neutral range is selected, and transmission of a driving force of an engine is cut. This is advantageous in securing safety against an erroneous operation.

As described above, provided is a vehicular shifter device which enables to secure safety against an erroneous operation, allows for the driver to select the neutral range and the travel range quickly and easily, and enables to suppress an increase in size of the device.

In the vehicular shifter device, preferably, the control means may switch the range to the travel range when the operation member is shifted from the home position in the predetermined direction again within a predetermined period of time after the shift operation. The control means may keep the range at the neutral range when the operation member is not shifted from the home position in the predetermined direction within the predetermined period of time after the shift operation.

According to the aforementioned configuration, the range is switched to the travel range only when a same shift operation is performed consecutively within the predetermined period of time. This makes it possible to clearly confirm a driver's intention of selecting the travel range. Unless otherwise, the neutral range is maintained. This is advantageous securing safety.

In the vehicular shifter device, preferably, the control means may keep the range at the neutral range when the operation member is shifted in a different manner from the shift operation after the shift operation.

According to the aforementioned configuration, when a driver's intention of selecting the travel range cannot be confirmed because a shift direction of the operation member is different, a shift amount is insufficient, or the like, the range is not switched but is kept at the neutral range. This is advantageous in securing safety.

The vehicular shifter device may preferably further include a parking switch to be operated by the driver. In this configuration, the control means may set the range to a parking range when the parking switch is operated. The control means may switch the range from the parking range to the neutral range when the operation member is shifted from the home position in the predetermined direction in a state that the range is set to the parking range.

According to the aforementioned configuration, a shift operation of the operation member also functions as a release operation of the parking switch. Therefore, the driver does not have to release the parking switch in switching the range from the parking range to the neutral range. This is advantageous in improving operability in switching the range from the P-range to the N-range.

In the vehicular shifter device, preferably, the body portion may support the operation member to be shiftable from the home position in a first direction or in a second direction, the first direction and the second direction being different from each other. The control means may be operative to set the range to the neutral range when the operation member is shifted from the home position in the first direction, and to switch the range from the neutral range to a drive range being a forward travel range when the operation member is shifted from the home position in the first direction again after the shift operation; and to set the range to the neutral range when the operation member is shifted from the home position in the second direction, and to switch the range from the neutral range to a reverse range being a reverse travel range when the operation member is shifted from the home position in the second direction again after the shift operation.

According to the aforementioned configuration, the driver can select the drive range or the reverse range while clearly distinguishing the drive range and the reverse range from each other by a shift operation from the home position in a direction different from each other.

In the vehicular shifter device, preferably, the operation member may be a shift lever. The body portion may support the shift lever to be tiltable from the home position in the predetermined direction, and may cause the shift lever after a tilting operation to automatically return to the home position. The control means may set the range to the neutral range when the shift lever is tilted from the home position in the predetermined direction, and may switch the range from the neutral range to the travel range when the shift lever is tilted from the home position in the predetermined direction again after the tilting operation.

According to the aforementioned configuration, the driver can select the neutral range or the travel range quickly and easily by tilting the shift lever.

The invention claimed is:
1. A vehicular shifter device, comprising:
an operation member to be operated by a driver;
a body portion which supports the operation member to be shiftable from a home position in a predetermined direction during a shift operation, and which causes the operation member after the shift operation to automatically return to the home position;
a sensor which detects the shift operation of the operation member; and a control device which controls a range of a transmission mounted in a vehicle on the basis of a detection result of the sensor, wherein the control device sets the range to a neutral range when the sensor detects that the operation member undergoes the shift operation, the control device switches the range from the neutral range to a travel range when the sensor detects that the operation member undergoes the shift operation again within a predetermined period of time after the shift operation, and the control device keeps the range at the neutral range when the sensor does not detect that the operation member undergoes the shift operation again within the predetermined period of time after the shift operation.

2. The vehicular shifter device according to claim 1, wherein the control device keeps the range at the neutral range when the operation member is shifted in a different manner from the shift operation after the shift operation.

3. The vehicular shifter device according to claim 2, further comprising:

a parking switch to be operated by the driver, wherein the control device sets the range to a parking range when the parking switch is operated, and the control device switches the range from the parking range to the neutral range when the operation member is shifted from the home position in the predetermined direction in a state that the range is set to the parking range.

4. The vehicular shifter device according to claim 3, wherein the body portion supports the operation member to be shiftable from the home position in a first direction or in a second direction, the first direction and the second direction being different from each other, and the control device is operative:

to set the range to the neutral range when the operation member is shifted from the home position in the first direction, to switch the range from the neutral range to a drive range being a forward travel range when the operation member is shifted from the home position in the first direction again within the predetermined period of time after the shift operation, and to keep the range at the neutral range when the operation member is not shifted from the home position in the first direction within the predetermined period of time after the shift operation; and to set the range to the neutral range when the operation member is shifted from the home position in the second direction, to switch the range from the neutral range to a reverse range being a reverse travel range when the operation member is shifted from the home position in the second direction again within the predetermined period of time after the shift operation, and to keep the range at the neutral range when the operation member is not shifted from the home position in the second direction within the predetermined period of time after the shift operation.

5. The vehicular shifter device according to claim 4, wherein the operation member is a shift lever, the body portion supports the shift lever to be tiltable from the home position in the predetermined direction, and causes the shift lever after a tilting operation to automatically return to the home position, the control device sets the range to the neutral range when the shift lever is tilted from the home position in the predetermined direction, the control device switches the range from the neutral range to the travel range when the shift lever is tilted from the home position in the predetermined direction again within the predetermined period of time after the tilting operation, and the control device keeps the range at the neutral range when the shift lever is not tilted from the home position in the predetermined direction within the predetermined period of time after the tilting operation.

6. The vehicular shifter device according to claim 3, wherein the operation member is a shift lever, the body portion supports the shift lever to be tiltable from the home position in the predetermined direction, and causes the shift lever after a tilting operation to automatically return to the home position, the control device sets the range to the neutral range when the shift lever is tilted from the home position in the predetermined direction, the control device switches the range from the neutral range to the travel range when the shift lever is tilted from the home position in the predetermined direction again within the predetermined period of time after the tilting operation, and the control device keeps the range at the neutral range when the shift lever is not tilted from the home position in the predetermined direction within the predetermined period of time after the tilting operation.

7. The vehicular shifter device according to claim 2, wherein the body portion supports the operation member to be shiftable from the home position in a first direction or in a second direction, the first direction and the second direction being different from each other, and the control device is operative:

to set the range to the neutral range when the operation member is shifted from the home position in the first direction, to switch the range from the neutral range to a drive range being a forward travel range when the operation member is shifted from the home position in the first direction again within the predetermined period of time after the shift operation, and to keep the range at the neutral range when the operation member is not shifted from the home position in the first direction within the predetermined period of time after the shift operation; and to set the range to the neutral range when the operation member is shifted from the home position in the second direction, to switch the range from the neutral range to a reverse range being a reverse travel range when the operation member is shifted from the home position in the second direction again within the predetermined period of time after the shift operation, and to keep the range at the neutral range when the operation member is not shifted from the home position in the second direction within the predetermined period of time after the shift operation.

8. The vehicular shifter device according to claim 7, wherein the operation member is a shift lever, the body portion supports the shift lever to be tiltable from the home position in the predetermined direction, and causes the shift lever after a tilting operation to automatically return to the home position, the control device sets the range to the neutral range when the shift lever is tilted from the home position in the predetermined direction, the control device switches the range from the neutral range to the travel range when the shift lever is tilted from the home position in the predetermined direction again within the predetermined period of time after the tilting operation, and the control device keeps the range at the neutral range when the shift lever is not tilted from the home position in the predetermined direction within the predetermined period of time after the tilting operation.

9. The vehicular shifter device according to claim 2, wherein the operation member is a shift lever, the body portion supports the shift lever to be tiltable from the home position in the predetermined direction, and causes the shift lever after a tilting operation to automatically return to the home position, the control device sets the range to the neutral range when the shift lever is tilted from the home position in the predetermined direction, the control device switches the range from the neutral range to the travel range when the shift lever is tilted from the home position in the predetermined direction again within the predetermined period of time after the tilting operation, and the control device keeps the range at the neutral range when the shift lever is not tilted from the home position in the predetermined direction within the predetermined period of time after the tilting operation.

10. The vehicular shifter device according to claim 1, further comprising:

a parking switch to be operated by the driver, wherein the control device sets the range to a parking range when the parking switch is operated, and the control device switches the range from the parking range to the neutral range when the operation member is shifted from the home position in the predetermined direction in a state that the range is set to the parking range.

11. The vehicular shifter device according to claim 10, wherein the body portion supports the operation member to be shiftable from the home position in a first direction or in a second direction, the first direction and the second direction being different from each other, and the control device is operative:

to set the range to the neutral range when the operation member is shifted from the home position in the first direction, to switch the range from the neutral range to a drive range being a forward travel range when the operation member is shifted from the home position in the first direction again within the predetermined period of time after the shift operation, and to keep the range at the neutral range when the operation member is not shifted from the home position in the first direction within the predetermined period of time after the shift operation; and to set the range to the neutral range when the operation member is shifted from the home position in the second direction, to switch the range from the neutral range to a reverse range being a reverse travel range when the operation member is shifted from the home position in the second direction again within the predetermined period of time after the shift operation, and to keep the range at the neutral range when the operation member is not shifted from the home position in the second direction within the predetermined period of time after the shift operation.

12. The vehicular shifter device according to claim 11, wherein the operation member is a shift lever, the body portion supports the shift lever to be tiltable from the home position in the predetermined direction, and causes the shift lever after a tilting operation to automatically return to the home position, the control device sets the range to the neutral range when the shift lever is tilted from the home position in the predetermined direction, the control device switches the range from the neutral range to the travel range when the shift lever is tilted from the home position in the predetermined direction again within the predetermined period of time after the tilting operation, and the control device keeps the range at the neutral range when the shift lever is not tilted from the home position in the predetermined direction within the predetermined period of time after the tilting operation.

13. The vehicular shifter device according to claim 10, wherein the operation member is a shift lever, the body portion supports the shift lever to be tiltable from the home position in the predetermined direction, and causes the shift lever after a tilting operation to automatically return to the home position, the control device sets the range to the neutral range when the shift lever is tilted from the home position in the predetermined direction, the control device switches the range from the neutral range to the travel range when the shift lever is tilted from the home position in the predetermined direction again within the predetermined period of time after the tilting operation, and the control device keeps the range at the neutral range when the shift lever is not tilted from the home position in the predetermined direction within the predetermined period of time after the tilting operation.

14. The vehicular shifter device according to claim 1, wherein the body portion supports the operation member to be shiftable from the home position in a first direction or in a second direction, the first direction and the second direction being different from each other, and the control device is operative:

to set the range to the neutral range when the operation member is shifted from the home position in the first direction, to switch the range from the neutral range to a drive range being a forward travel range when the operation member is shifted from the home position in the first direction again within the predetermined period of time after the shift operation, and to keep the range at the neutral range when the operation member is not shifted from the home position in the first direction within the predetermined period of time after the shift operation; and to set the range to the neutral range when the operation member is shifted from the home position in the second direction, to switch the range from the neutral range to a reverse range being a reverse travel range when the operation member is shifted from the home position in the second direction again within the predetermined period of time after the shift operation, and to keep the range at the neutral range when the operation member is not shifted from the home position in the second direction within the predetermined period of time after the shift operation.

15. The vehicular shifter device according to claim 14, wherein the operation member is a shift lever, the body portion supports the shift lever to be tiltable from the home position in the predetermined direction, and causes the shift lever after a tilting operation to automatically return to the home position, the control device sets the range to the neutral range when the shift lever is tilted from the home position in the predetermined direction, the control device switches the range from the neutral range to the travel range when the shift lever is tilted from the home position in the predetermined direction again within the predetermined period of time after the tilting operation, and the control device keeps the range at the neutral range when the shift lever is not tilted from the home position in the predetermined direction within the predetermined period of time after the tilting operation.

16. The vehicular shifter device according to claim 1, wherein the operation member is a shift lever, the body portion supports the shift lever to be tiltable from the home position in the predetermined direction, and causes the shift lever after a tilting operation to automatically return to the home position, the control device sets the range to the neutral range when the shift lever is tilted from the home position in the predetermined direction, the control device switches the range from the neutral range to the travel range when the shift lever is tilted from the home position in the predetermined direction again within the predetermined period of time after the tilting operation, and the control device keeps the range at the neutral range when the shift lever is not tilted from the home position in the predetermined direction within the predetermined period of time after the tilting operation.

* * * * *